United States Patent
Seo et al.

(10) Patent No.: US 10,621,087 B2
(45) Date of Patent: Apr. 14, 2020

(54) OPERATING METHOD OF DATA STORAGE DEVICE

(71) Applicant: SK hynix Inc.

(72) Inventors: Yun Chan Seo, Gyeonggi-do (KR); Hoe Seung Jung, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 15/703,068

(22) Filed: Sep. 13, 2017

(65) Prior Publication Data

US 2018/0225200 A1    Aug. 9, 2018

(30) Foreign Application Priority Data

Feb. 9, 2017    (KR) .................. 10-2017-0018107

(51) Int. Cl.
*G06F 12/06* (2006.01)
*G06F 12/12* (2016.01)
*G06F 12/02* (2006.01)

(52) U.S. Cl.
CPC ...... *G06F 12/0646* (2013.01); *G06F 12/0246* (2013.01); *G06F 12/12* (2013.01); *G06F 2212/1036* (2013.01); *G06F 2212/251* (2013.01); *G06F 2212/7201* (2013.01); *G06F 2212/7205* (2013.01); *G06F 2212/7211* (2013.01)

(58) Field of Classification Search
CPC . G06F 12/0646; G06F 12/12; G06F 2212/251
See application file for complete search history.

(56) References Cited

U.S. PATENT DOCUMENTS

| 2014/0215129 A1* | 7/2014 | Kuzmin | G06F 12/0246 711/103 |
|---|---|---|---|
| 2016/0078966 A1* | 3/2016 | Li | G11C 16/349 714/723 |
| 2017/0351427 A1* | 12/2017 | Klein | G06F 3/061 |

FOREIGN PATENT DOCUMENTS

KR    1020080085574    9/2008

OTHER PUBLICATIONS

Shimpi, Anand Lal "The SSD Anthology: Understanding SSDs and New Drives from OCZ" [online] Mar. 18, 2009 [Retrieved on Oct. 25 2018]. Retrieved from the internet at <URL: http://www.anandtech.com/show/2738>. (Year: 2009).*

* cited by examiner

Primary Examiner — David Yi
Assistant Examiner — Dustin B. Fulford
(74) Attorney, Agent, or Firm — IP & T Group LLP

(57) ABSTRACT

A method for operating a data storage device includes storing an erase count corresponding to a physical address, as a reference value, in response to a first event; comparing a current value of the erase count with the reference value in response to a second event; and selectively performing a purge operation for the physical address, depending on a result of the comparing.

14 Claims, 7 Drawing Sheets

OPERATING METHOD OF DATA STORAGE DEVICE

CROSS-REFERENCES TO RELATED APPLICATION

The present application claims priority under 35 U.S.C. § 119(a) to Korean application number 10-2017-0018107, filed on Feb. 9, 2017, in the Korean Intellectual Property Office, which is incorporated herein by reference in its entirety.

BACKGROUND

1. Technical Field

Various embodiments generally relate to a data storage device, and, more particularly, to an operating method of a data storage device including a nonvolatile memory device.

2. Related Art

Data storage devices store data provided by an external device in response to a write request. Data storage devices may also provide stored data to an external device in response to a read request. Examples of external devices that use data storage devices include computers, digital cameras, cellular phones and the like. Data storage devices may be embedded in an external device during manufacturing of the external devices or may be fabricated separately and then connected afterwards to an external device.

SUMMARY

In an embodiment, a method for operating a data storage device may include: storing an erase count corresponding to a physical address, as a reference value, in response to a first event; comparing a current value of the erase count with the reference value in response to a second event; and selectively performing a purge operation for the physical address, depending on a result of the comparing.

In an embodiment, a method for operating a data storage device may include: storing an erase count corresponding to a physical address, as a reference value, in response to a first event; comparing a current value of the erase count with the reference value in response to a second event; and selectively skipping performing an erase operation for the physical address, depending on a result of the comparing.

In an embodiment, a method for operating a data storage device may include: comparing an erase count corresponding to a physical address with a reference value in response to a purge request transmitted from an external device; and selectively skipping performing a purge operation for the physical address, depending on a result of the comparing.

BRIEF DESCRIPTION OF THE DRAWINGS

The above and other features and advantages of the present invention will become more apparent to those skilled in the art to which the present invention belongs by describing various embodiments thereof with reference to the attached drawings in which.

DETAILED DESCRIPTION

Figure 1:
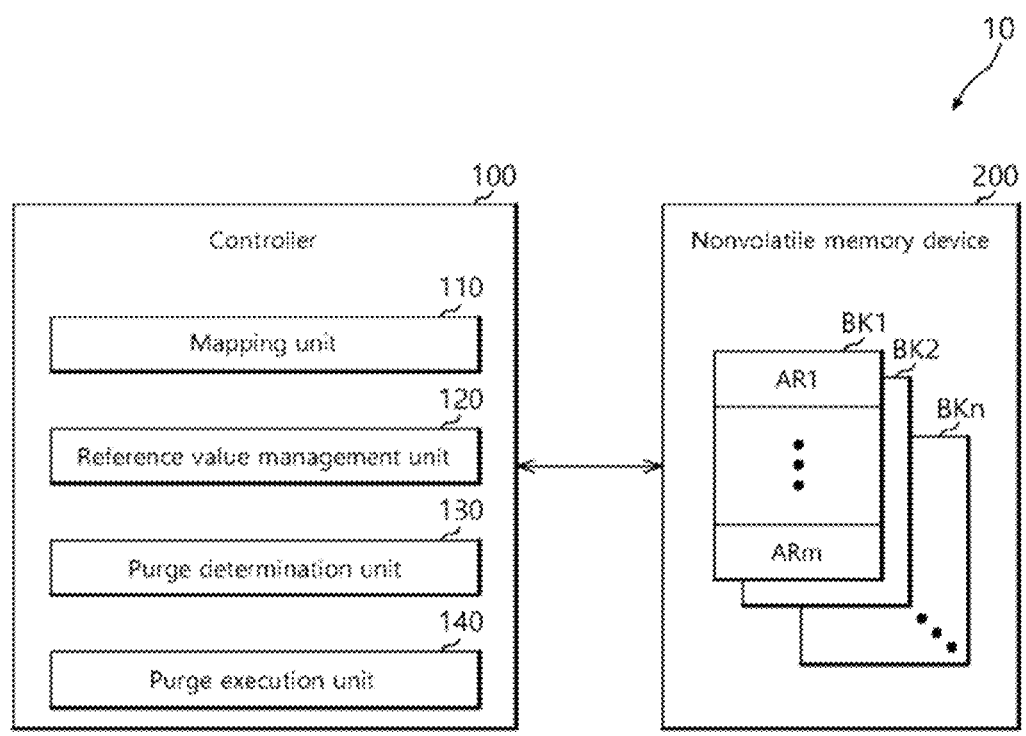
FIG. 1 is a block diagram illustrating a data storage device in accordance with an embodiment of the present invention.

Hereinafter, a data storage device and an operating method thereof according to the present invention will be described with reference to the accompanying drawings through exemplary embodiments of the present invention. The present invention may, however, be embodied in different forms and should not be construed as being limited to the embodiments set forth herein. Rather, these embodiments are provided to describe the present invention in detail to the extent that a person skilled in the art to which the invention pertains can enforce the technical concepts of the present invention.

It is to be understood that embodiments of the present invention are not limited to the particulars shown in the drawings, that the drawings are not necessarily to scale, and, in some instances, proportions may have been exaggerated in order to more clearly depict certain features of the invention. While particular terminology is used, it is to be appreciated that the terminology used is for describing particular embodiments only and is not intended to limit the scope of the present invention.

It will be further understood that when an element is referred to as being "connected to", or "coupled to" another element, it may be directly on, connected to, or coupled to the other element, or one or more intervening elements may be present. In addition, it is will also be understood that when an element is referred to as being "between" two elements, it may be the only element between the two elements, or one or more intervening elements may also be present.

The phrase "at least one of . . . and . . . ," when used herein with a list of items, means a single item from the list or any combination of items in the list. For example, "at least one of A, B, and C" means, only A, or only B, or only C, or any combination of A, B, and C.

The term "or" as used herein means either one of two or more alternatives but not both nor any combinations thereof.

As used herein, singular forms are intended to include the plural forms as well, unless the context clearly indicates otherwise. It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, an element also referred to as a feature described in connection with one embodiment may be used singly or in combination with other elements of another embodiment, unless specifically indicated otherwise.

Hereinafter, the various embodiments of the present invention will be described in detail with reference to the attached drawings.

FIG. 1 is a block diagram illustrating a data storage device 10 in accordance with an embodiment of the present invention.

The data storage device 10 may be configured to store data provided from an external device (not shown), in response to a write request from the external device. Also, the data storage device 10 may be configured to provide stored data to the external device, in response to a read request from the external device.

The data storage device 10 may be prepared in the form of a Personal Computer Memory Card International Association (PCMCIA) card, a Compact Flash (CF) card, a smart media card, a memory stick, various multimedia cards (MMC, eMMC, RS-MMC, and MMC-Micro), various secure digital cards (SD, Mini-SD, and Micro-SD), a Universal Flash Storage (UFS), a Solid State Drive (SSD) and the like.

The data storage device 10 may include a controller 100 and a nonvolatile memory device 200.

The controller 100 may control general operations of the data storage device 10. The controller 100 may store data in the nonvolatile memory device 200 in response to a write request transmitted from the external device, and may read data stored in the nonvolatile memory device 200 and output read data to the external device in response to a read request transmitted from the external device.

Also, the controller 100 may perform management operations for the nonvolatile memory device 200, for example, a mapping operation, an unmap operation and a purge operation, according to requests from the external device. To this end, the controller 100 may include a mapping unit 110, a reference value management unit 120, a purge determination unit 130, and a purge execution unit 140.

The mapping unit 110 may manage a map table in which is logical addresses and physical addresses are mapped. A logical address may be an address which is used for the external device to access the nonvolatile memory device 200, and a physical address may be an actual address to designate a memory region of the nonvolatile memory device 200. The mapping unit 110 may map, in the map table, a logical address corresponding to data provided from the external device and a physical address of a memory region in which the data is written. When the external device sends a read request for a logical address, the mapping unit 110 may check a physical address mapped to the logical address in the map table, and read data from a memory region corresponding to the checked physical address and provide the data to the external device.

Further, the mapping unit 110 may perform an unmap operation in response to an unmap request from the external device. The unmap request may be associated with at least one logical address which is mapped to a physical address. The mapping unit 110 may unmap the unmap-requested logical address and the physical address mapped to the corresponding logical address. Due to the unmap operation, data corresponding to the unmapped logical address, that is, data stored in a memory region corresponding to the unmapped physical address, may become invalid data. An exemplary method for performing the unmap operation will be described later in detail with reference to FIG. 2.

The reference value management unit 120 may generate a reference value corresponding to the unmapped physical address when the unmap operation is performed. The reference value management unit 120 may store an erase count corresponding to the unmapped physical address, as the reference value corresponding to the unmapped physical address. The erase count corresponding to the unmapped physical address may be an erase count of a memory block (hereinafter, referred to as a target memory block) including the memory region corresponding to the unmapped physical address. The reference value may be used in determining, by the purge determination unit 130, whether to perform a purge operation. An exemplary method for generating the reference value will be described later in detail with reference to FIGS. 4 and 5.

The purge determination unit 130 may determine whether to perform a purge operation, in response to a purge request received from the external device. For example, the purge request may include a complete erase of data of the nonvolatile memory device 200 which correspond to the unmapped logical address. The purge determination unit 130 may compare a current value of the erase count of the target memory block with the reference value. When, as a comparison result, the current value is identical to the reference value, the purge determination unit 130 may determine to perform a purge operation for the target memory block. However, when the current value is different from the reference value, the purge determination unit 130 may determine not to perform a purge operation for the target memory block. An exemplary determination method of the purge determination unit 130 will be described later in detail with reference to FIGS. 4 and 5.

The purge execution unit 140 may perform a purge operation for the target memory block, depending on a determination of the purge determination unit 130. The purge operation may include a copy operation and an erase operation for the target memory block. The purge operation for the target memory block may completely erase the data corresponding to the unmapped logical address. An exemplary method for performing the purge operation will be described later in detail with reference to FIG. 3.

Therefore, according to an embodiment of the present invention, the purge execution unit 140 can skip performing an unnecessary purge operation depending on a determination of the purge determination unit 130, thus reducing memory wear and reducing the overall costs associated with the data storage device 10.

The nonvolatile memory device 200 may store data transmitted from the controller 100, may read stored data and transmit read data to the controller 100, according to control of the controller 100. The nonvolatile memory device 200 may include a plurality of memory blocks BK1 to BKn. A memory block may be a unit by which the nonvolatile memory device 200 performs an erase operation. Therefore, the nonvolatile memory device 200 may erase simultaneously data stored in a certain memory block, through an erase operation. Each of the memory blocks BK1 to BKn may include a plurality of memory regions AR1 to ARm. The nonvolatile memory device 200 may access simultaneously one or more memory regions of one or more memory blocks when performing a write operation or a read operation.

The nonvolatile memory device 200 may be any suitable memory device including a flash memory, such as a NAND flash or a NOR flash, a Ferroelectrics Random Access Memory (FeRAM), a Phase-Change Random Access Memory (PCRAM), a Magnetoresistive Random Access Memory (MRAM), a Resistive Random Access Memory (ReRAM), and the like.

While it is Illustrated in FIG. 1 that the data storage device 10 includes one nonvolatile memory device 200, it is to be noted that the number of nonvolatile memory devices included in the data storage device 10 is not limited thereto. For example, two or more nonvolatile memory devices may be coupled to the controller 100.

Figure 2:
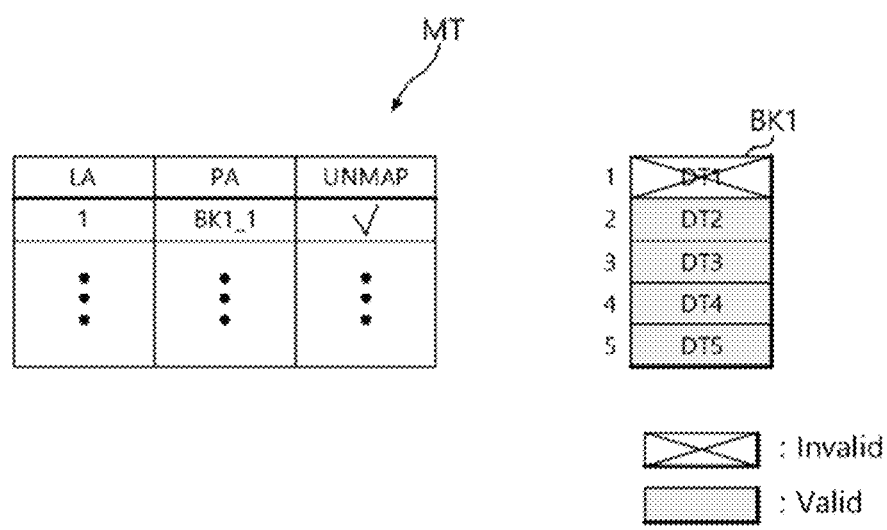
FIG. 2 is a diagram explaining an unmap operation of a mapping unit of FIG. 1.

FIG. 2 is a diagram explaining an unmap operation of the mapping unit 110 of FIG. 1.

Referring to FIG. 2, there is illustrated a map table MT which is managed by the mapping unit 110. The map table MT may include physical addresses PA which are mapped to logical addresses LA. For example, referring to the map table MT, a logical address "1" may be mapped to a physical address "BK1_1." The physical address "BK1_1" may be an address which designates a first memory region of the memory block BK1. Moreover, the map table MT may include unmap fields UNMAP corresponding to the respective logical addresses LA.

The mapping unit 110 may perform an unmap operation as follows, when an unmap request associated with the logical address "1" is received from the external device. The mapping unit 110 may unmap the logical address "1" and the physical address "BK1_1." For example, the mapping unit 110 may perform the unmap operation by marking the unmap field UNMAP which corresponds to the logical address "1" in the map table MT. More specifically, data corresponding to the unmapped logical address "1," that is, data DT1 stored in the memory region of the unmapped physical address "BK1_1," become invalid data due to the unmap operation by marking the unmap field UNMPA with a mark indicating that the data of the physical address BK1_1 is invalid.

Thereafter, the mapping unit 110 may be aware of that the logical address "1" is unmapped and the data DT1 is invalid data, by checking the marking of the unmap field UNMAP. Therefore, if the external device transmits a read request for the logical address "1," the mapping unit 110 may notify the external device that the logical address "1" is unmapped, by checking the marking of the unmap field UNMAP which corresponds to the logical address "1."

Figure 3:
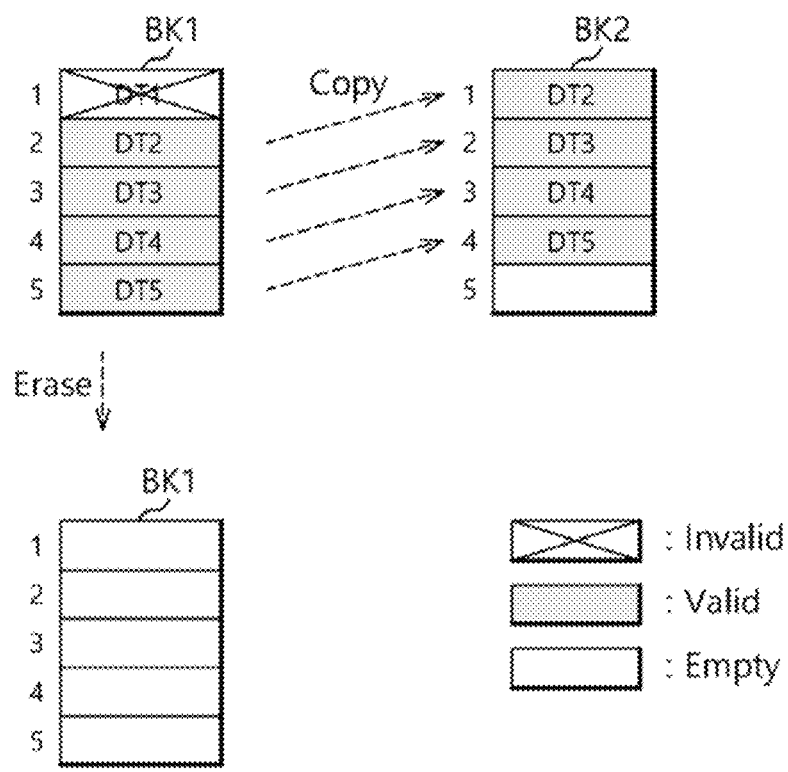
FIG. 3 is a diagram explaining a purge operation of a purge execution unit of FIG. 1.

FIG. 3 is a diagram explaining a purge operation of the purge execution unit 140 of FIG. 1.

Referring to FIG. 3, the purge execution unit 140 may perform a purge operation in response to a purge request received from the external device. The purge request may request a complete erasure of the data corresponding to at least one logical address which was unmapped previously, from the nonvolatile memory device 200. FIG. 3 illustrates an example of a purge operation for the logical address "1" which was unmapped as illustrated in FIG. 2. When it is determined that the data DT1 corresponding to the unmapped logical address "1" is stored in the memory block BK1, the memory block BK1 becomes the target memory block for the purge operation and the purge execution unit 140 performs the purge operation for the target memory block BK1, in response to the purge request for the logical address "1."

In more detail, the purge operation may include a copy operation and an erase operation for the target memory block BK1. The purge execution unit 140 may copy all valid data, e.g., DT2 to DT5, which are stored in the target memory block BK1, to another memory block, e.g., memory block BK2, of the nonvolatile memory device 200, and may then perform an erase operation for the target memory block BK1. As a result, the data DT1 corresponding to the logical address "1" may be erased completely from the target memory block BK1. The memory block BK2 of the nonvolatile memory device 200 where the data of memory block BK1 are copied may have a sufficient number of empty regions for receiving the valid data of memory block BK1. For example, as illustrated in FIG. 3, the memory block BK2 of the nonvolatile memory device 200 where the data of memory block BK1 are copied may be an empty memory block.

It is to be noted that, while the purge request requests the purge operation for the unmapped physical address "BK1_1," the purge operation is performed for the entire target memory block BK1 because the nonvolatile memory device 200 performs an erase operation by the unit of memory block. Therefore, a purge operation may serve as a factor that increases costs and accelerates wear of a memory.

Meanwhile, the external device may transmit a purge request with a time interval delay after transmitting an unmap request. In this case, the target memory block BK1 of FIG. 3 may have been erased already through an internal operation, for example, a garbage collection operation, of the controller 100, before the purge request is transmitted after the logical address "1" is unmapped. Hence, when the purge request is transmitted, the target memory block BK1 may be an empty memory block or new data which replaced the invalid data may be stored therein. In this regard, if a purge operation for the memory block BK1 is performed even though the data DT1 corresponding to the unmapped logical address "1" has been erased already, costs may increase and memory wear may accelerate. Hence, in order to address this concern, the purge determination unit 130 according to the present embodiment may determine whether a purge operation for the target memory block BK1 is needed actually, in response to a purge request from the external device.

Figure 4:
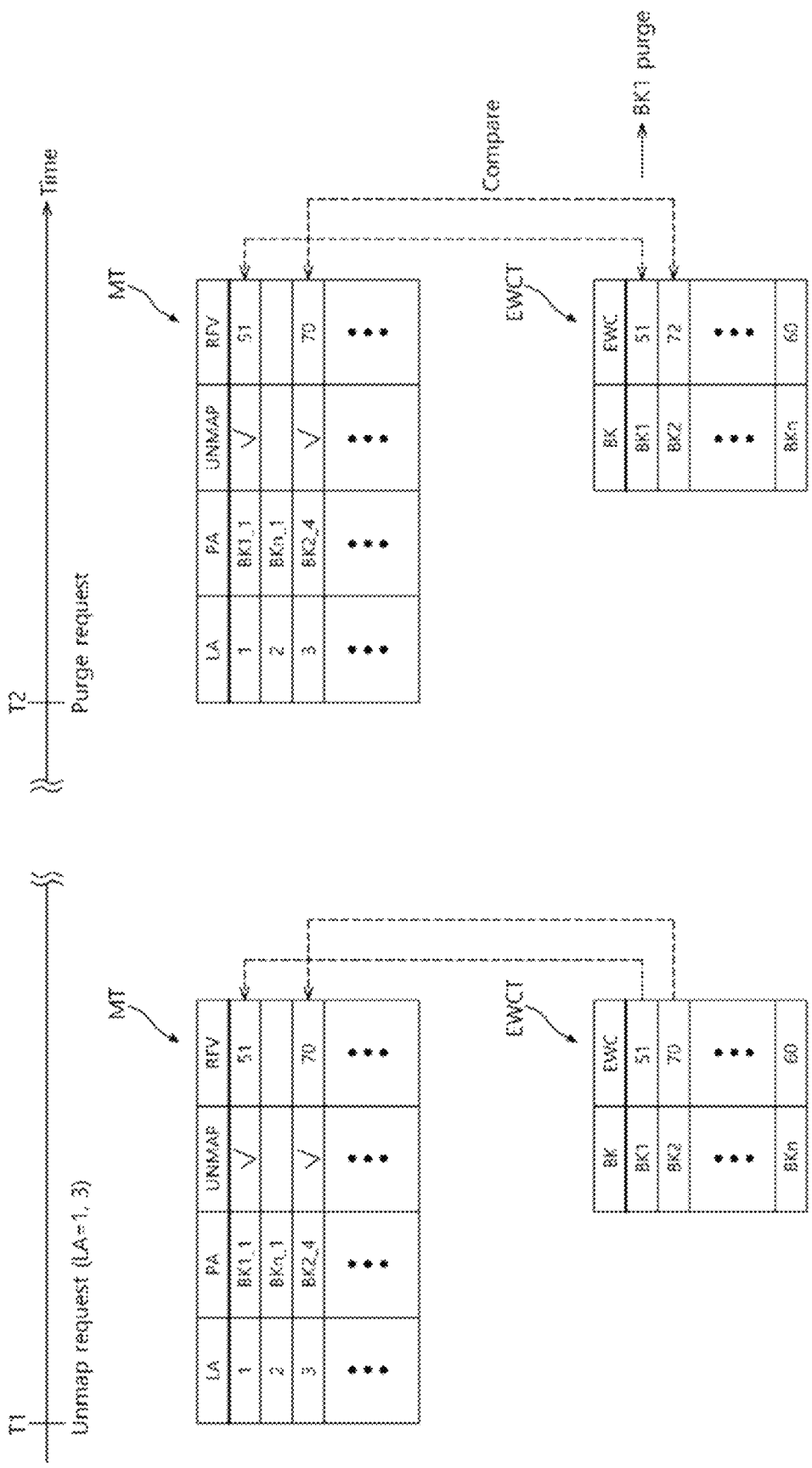
FIG. 4 is a diagram explaining operations of a reference value management unit and a purge determination unit of FIG. 1.

FIG. 4 is a diagram explaining operations of the reference value management unit 120 and the purge determination unit 130 of FIG. 1. FIG. 4 illustrates a map table MT and an erase count table EWCT when an unmap request and a purge request are transmitted, with a time interval therebetween, at times T1 and T2, respectively. The map table MT may include mapping relationships between logical addresses LA and physical addresses PA, and the erase count table EWCT may include erase counts EWC of the respective memory blocks BK1 to BKn.

Referring to FIG. 4, at the time T1, the controller 100 may receive unmap requests for logical addresses "1" and "3" from the external device. In the same manner as described above with reference to FIG. 2, the mapping unit 110 may then mark the unmap fields UNMAP corresponding to the logical addresses "1" and "3" in the map table MT.

The reference value management unit 120 may store erase counts EWC corresponding to unmapped physical addresses "BK1_1" and "BK2_4," that is, "51" and "70," as reference values RFV of the unmapped physical addresses "BK1_1" and "BK2_4," in the map table MT. In other words, memory blocks BK1 and BK2 including the unmapped physical addresses "BK1_1" and "BK2_4" become target memory blocks, and the erase counts EWC of the target memory blocks BK1 and BK2 may become the reference values RFV.

Then, at the time T2, the controller 100 may receive a purge request from the external device. First, the purge determination unit 130 may determine that the physical address "BK1_1" has been unmapped, by checking the unmap field UNMAP which is marked. In the case where the physical address "BK1_1" has undergone an erase operation between the times T1 and T2, the physical address "BK1_1" may be in a state in which it is mapped to another logical address. Therefore, the marking of the unmap field UNMAP at the time T2 may mean that the physical address "BK1_1" has been unmapped before the time T2, or may mean that the corresponding logical address "1" is in the unmapped state even at the time T2.

The purge determination unit 130 may compare a current erase count "51" corresponding to the physical address "BK1_1" which has been unmapped, with the reference value "51." The fact that the current erase count "51" is identical to the reference value "51" means that the target memory block BK1 has not been erased between the times T1 and T2. Namely, this means that data corresponding to the unmapped logical address "1" is still stored in the target memory block BK1. Therefore, the purge determination unit 130 may then determine to perform a purge operation for the target memory block BK1, since the current erase count "51" is identical to the reference value "51".

Similarly, the purge determination unit 130 may determine that the physical address "BK2_4" has been unmapped, by checking the unmap field UNMAP which is marked. The purge determination unit 130 may compare a current erase count "72" corresponding to the physical address "BK2_4" with the reference value "70." The fact that the current erase count "72" and the reference value "70" are different means that the target memory block BK2 has been erased between the times T1 and T2. Namely, this means that data corresponding to the unmapped logical address "3" does not remain in the target memory block BK2. Therefore, the purge determination unit 130 may determine not to perform a purge operation for the target memory block BK2, since the current erase count "72" and the reference value "70" are different.

In this manner, an unnecessary purge operation for the target memory block BK2 is omitted, thus reducing costs memory wear.

Figure 5:
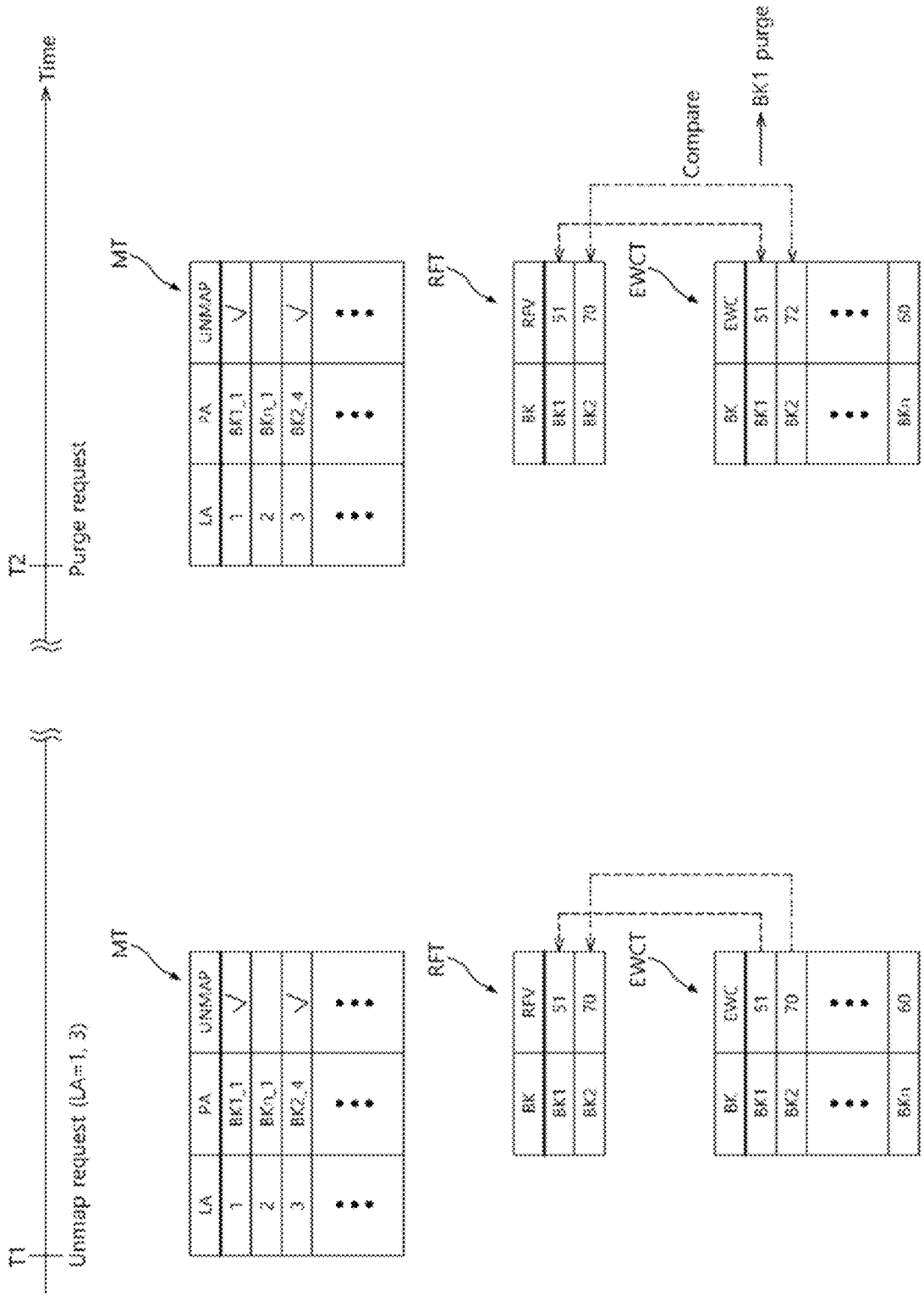
FIG. 5 is a diagram explaining a method of managing reference values using a reference value table.

FIG. 5 is a diagram explaining a method of managing reference values RFV using a reference value table RFT. The situation illustrated in FIG. 5 may be substantially the same as the situation illustrated in FIG. 4 except that the reference values RFV are stored not in the map table MT but in the separate reference value table RFT.

For example, the reference value management unit 120 may manage the reference values RFV using the reference value table RFT. The reference value table RFT may include the reference values RFV corresponding to the target memory blocks BK1 and BK2. Hence, when a purge request is received, the purge determination unit 130 may compare a current erase count EWC of the erase count table TWCT and a reference value RFV of the reference value table RFT, for each of the target memory blocks BK1 and BK2. The purge determination unit 130 may determine whether to perform purge operations for the target memory blocks BK1 and BK2, according to comparison results, in the same manner as the method described above with reference to FIG. 4.

Figure 6:
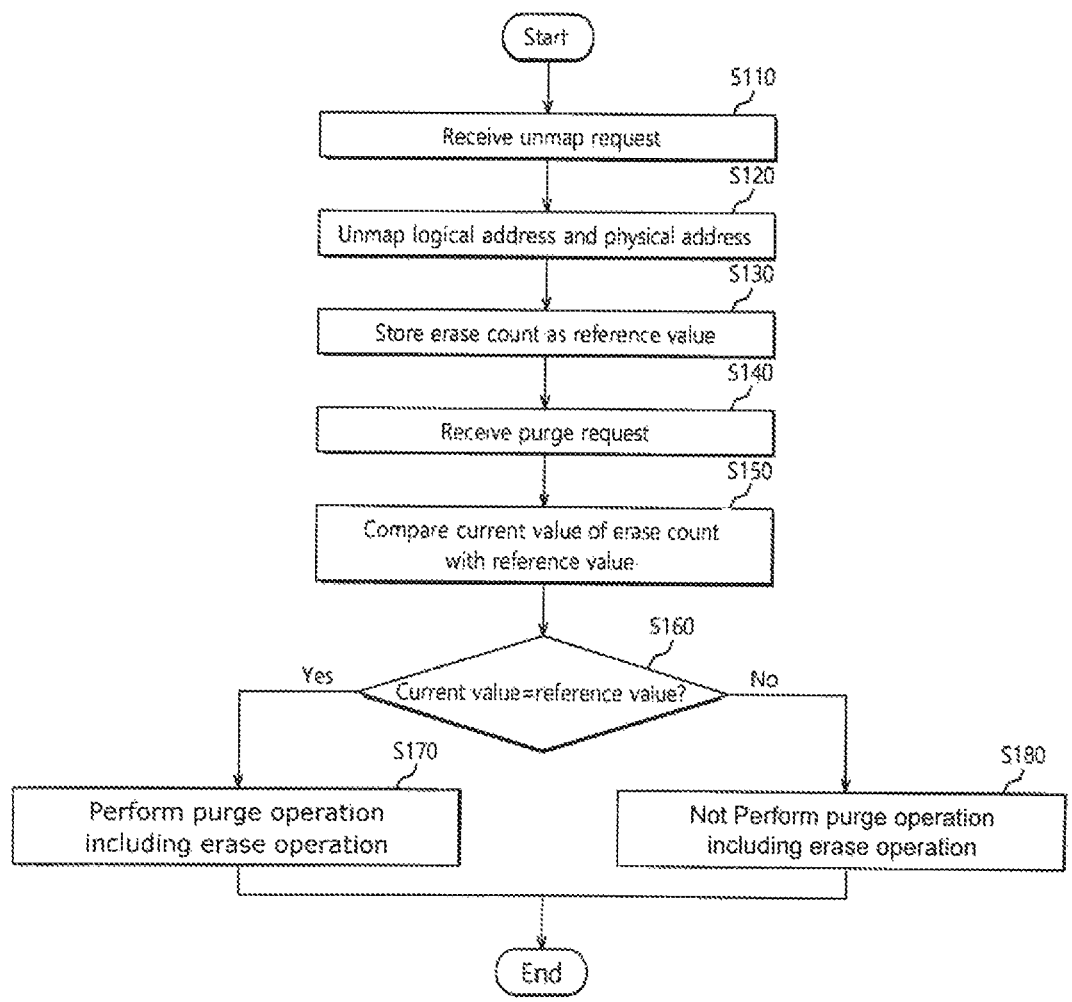
FIG. 6 is a flow chart explaining an operating method of a data storage device in accordance with an embodiment of the present invention.

FIG. 6 is a flow chart explaining an operating method of the data storage device 10 in accordance with an embodiment of the present invention.

At step S110, the controller 100 may receive an unmap request from the external device.

At step S120, the mapping unit 110 may unmap an unmap-requested logical address and a physical address mapped to the corresponding logical address.

At step S130, the reference value management unit 120 may store an erase count corresponding to the unmapped physical address at the time of the unmapping, as a reference value corresponding to the unmapped physical address. The erase count corresponding to the unmapped physical address may be an erase count of a target memory block including a memory region corresponding to the unmapped physical address at the time of the unmapping.

Then at step S140, the controller 100 may receive a purge request from the external device.

At step S150, the purge determination unit 130 may compare an erase count corresponding to the physical address which has been unmapped, that is, a current erase count of the target memory block, with the reference value corresponding to the physical address which has been unmapped.

At step S160, the purge determination unit 130 may determine whether the current value is identical to the reference value. When the current value is identical to the reference value, the process may proceed to step S170. When the current value is different from the reference value, the process may proceed to step S180.

At the step S170, the purge determination unit 130 may determine to perform a purge operation for the target memory block. Accordingly, the purge execution unit 140 may perform the purge operation for the target memory block. The purge operation may include a copy operation and an erase operation for the target memory block. Resultantly, the purge operation for the target memory block may completely erase the data corresponding to the unmapped logical address.

At the step S180, the purge determination unit 130 may determine not to perform a purge operation for the target memory block. Accordingly, the purge execution unit 140 may skip performing the purge operation for the target memory block.

Figure 7:
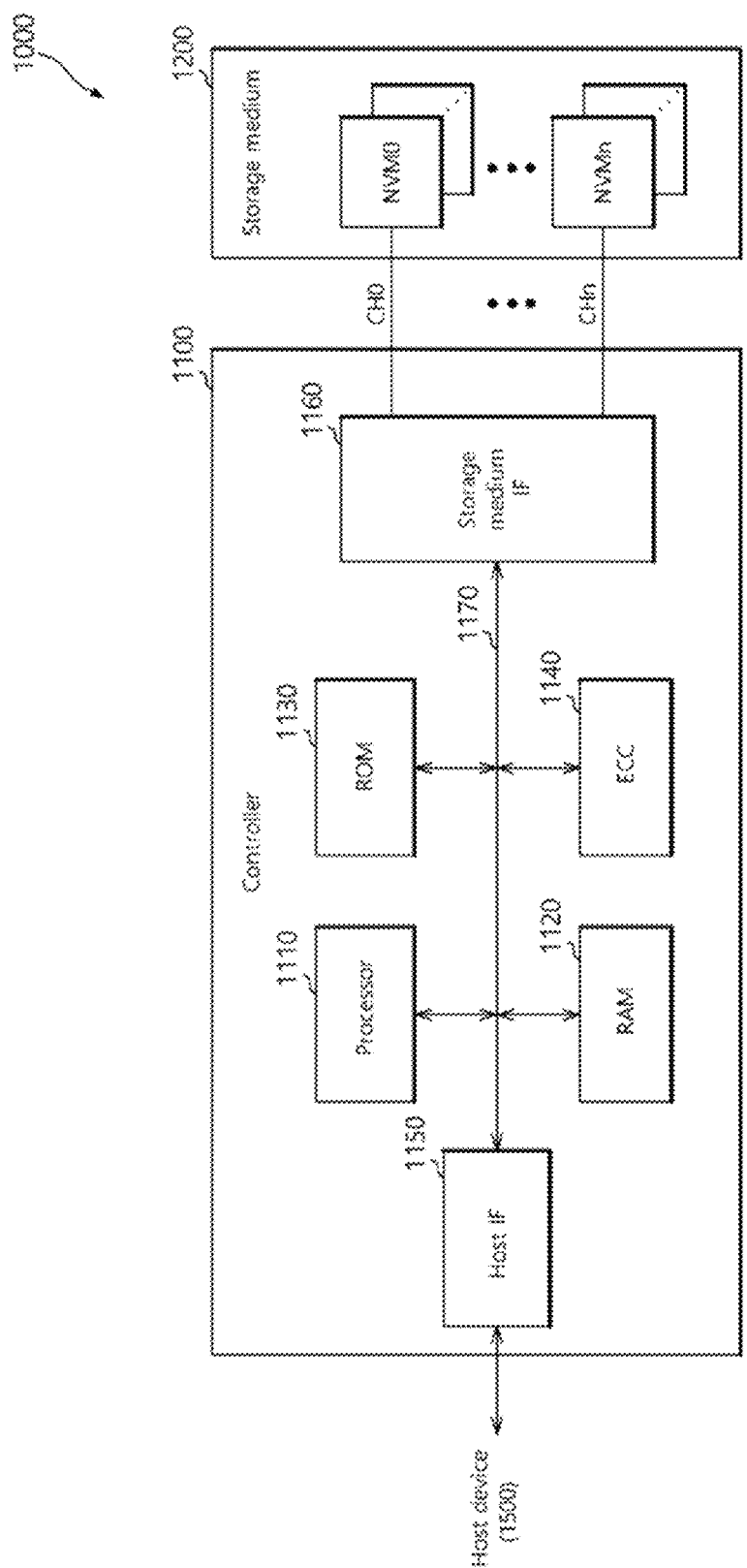
FIG. 7 is a block diagram Illustrating a solid state drive (SSD) in accordance with an embodiment of the present invention.

FIG. 7 is a block diagram illustrating a solid state drive (SSD) 1000 in accordance with an embodiment of the present invention.

The SSD 1000 may include a controller 1100 and a storage medium 1200.

The controller 1100 may control data exchange between a host device 1500 and the storage medium 1200. The controller 1100 may include a processor 1110, a random access memory (RAM) 1120, a read only memory (ROM) 1130, an error correction code (ECC) unit 1140, a host interface 1150 and a storage medium interface 1160 which are coupled through an internal bus 1170.

The processor 1110 may control general operations of the controller 1100. The processor 1110 may store data in the storage medium 1200 and read stored data from the storage medium 1200, according to data processing requests from the host device 1500. In order to efficiently manage the storage medium 1200, the processor 1110 may control internal operations of the SSD 1000 such as a merge operation, a wear leveling operation, and so forth.

The processor 1110 may perform, in substantially the same manner, the operations of the mapping unit 110, the reference value management unit 120, the purge determination unit 130 and the purge execution unit 140 shown in FIG. 1. That is, the processor 1110 may store an erase count corresponding to a physical address, as a reference value, in response to an unmap request transmitted from an external device, e.g., the host device 1500. The processor 1110 may compare a current value of erase count with the reference value in response to a purge request transmitted from the external device with a time delay from the unmapping operation. The processor 1110 may perform selectively a purge operation for the physical address, depending on a comparison result.

The RAM 1120 may store programs and program data to be used by the processor 1110. The RAM 1120 may temporarily store data transmitted from the host interface 1150 before transferring it to the storage medium 1200, and may temporarily store data transmitted from the storage medium 1200 before transferring it to the host device 1500.

The ROM 1130 may store program codes to be read by the processor 1110. The program codes may include commands to be processed by the processor 1110, for the processor 1110 to control the internal units of the controller 1100.

The ECC unit 1140 may encode data to be stored in the storage medium 1200, and may decode data read from the storage medium 1200. The ECC unit 1140 may detect and correct an error occurred in data, according to an ECC algorithm.

The host interface 1150 may exchange data processing requests, data, etc. with the host device 1500.

The storage medium interface 1160 may transmit control signals and data to the storage medium 1200. The storage medium interface 1160 may be receive data from the storage medium 1200. The storage medium interface 1160 may be coupled with the storage medium 1200 through a plurality of channels CH0 to CHn.

The storage medium 1200 may include a plurality of nonvolatile memory devices NVM0 to NVMn. Each of the plurality of nonvolatile memory devices NVM0 to NVMn may perform an operation including write, read, unmap and purge operations according to control of the controller 1100.

Figure 8:
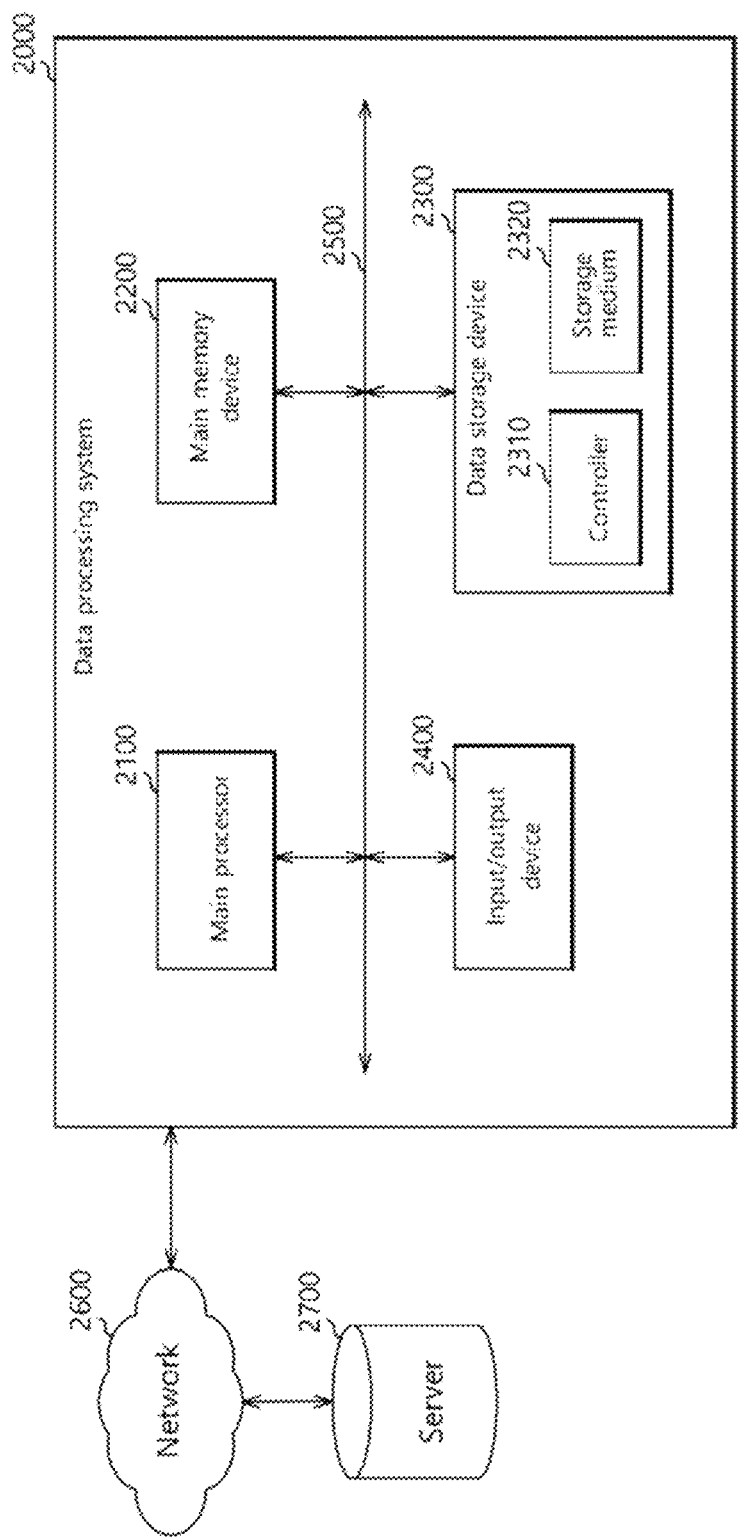
FIG. 8 is a block diagram Illustrating a data processing system in accordance with an embodiment of the present invention.

FIG. 8 is a block diagram illustrating a data processing system 2000 in accordance with an embodiment of the present invention.

The data processing system 2000 may include a computer, a laptop, a netbook, a smart phone, a digital TV, a digital camera, a navigator, etc. The data processing system 2000 may include a main processor 2100, a main memory device 2200, a data storage device 2300, and an input/output device 2400. The internal units of the data processing system 2000 may exchange data, control signals, etc. through a system bus 2500.

The main processor 2100 may control general operations of the data processing system 2000. The main processor 2100 may be a central processing unit, for example, a microprocessor. The main processor 2100 may execute softwares such as an operation system, an application, a device driver, and so forth, on the main memory device 2200.

The main memory device 2200 may store programs and program data to be used by the main processor 2100. The main memory device 2200 may temporarily store data to be transmitted to the data storage device 2300 and the input/output device 2400.

The data storage device 2300 may include a controller 2310 and a storage medium 2320. The data storage device 2300 may be configured and operate substantially similarly to the data storage device 10 of FIG. 1.

The input/output device 2400 may include a keyboard, a scanner, a touch screen, a screen monitor, a printer, a mouse, or the like, capable of exchanging data with a user, such as receiving a command for controlling the data processing system 2000 from the user or providing a processed result to the user.

According to an embodiment, the data processing system 2000 may communicate with at least one server 2700 through a network 2600 such as a local area network (LAN), a wide area network (WAN), a wireless network, and so on. The data processing system 2000 may include a network interface (not shown) to access the network 2600.

While various embodiments have been described above, it will be understood to those skilled in the art that the embodiments described are examples only. Accordingly, the data storage device and the operating method thereof described herein should not be limited to the described embodiments. It will be apparent to those skilled in the art to which the present invention pertains that various other changes and modifications may be made without departing from the spirit and scope of the invention as defined in the following claims.

What is claimed is:

1. An operating method of a data storage device including a controller and a nonvolatile memory device including a plurality of memory blocks, the operating method comprising:
    storing, by the controller, a value of an erase count at the time of a first event as a reference value, the erase count corresponding to a physical address of the nonvolatile memory device;
    comparing, by the controller, a current value of the erase count at the time of a second event with the reference value;
    performing, by the controller, a purge operation for the physical address when the current value is identical to the reference value, and
    skipping, by the controller, the performing of the purge operation when the current value is different from the reference value.

2. The operating method according to claim 1, wherein the first event is an unmap request for a logical address mapped to the physical address and the second event is a purge request transmitted from an external device.

3. The operating method according to claim 2, further comprising:
    unmapping, by the controller, the logical address and the physical address in response to the unmap request.

4. The operating method according to claim 1, wherein the performing of the purge operation comprises:
    performing, by the controller, a copy operation for valid data in a target memory block including a memory region corresponding to the physical address, to another memory block; and
    performing, by the controller, an erase operation for the target memory block.

5. The operating method according to claim 1, wherein the erase count includes an erase count of a memory block including a memory region corresponding to the physical address.

6. An operating method of a data storage device including a controller and a nonvolatile memory device including a plurality of memory blocks, the operating method comprising:
- storing, by the controller, a value of an erase count at the time of a first event as a reference value, the erase count corresponding to a physical address of the nonvolatile memory device;
- comparing, by the controller, a current value of the erase count at the time of a second event with the reference value;
- performing, by the controller, an erase operation for the physical address when the current value is identical to the reference value, and
- skipping, by the controller, the performing of the erase operation when the current value is different from the reference value.

7. The operating method according to claim 6, wherein the first event includes an unmap request for a logical address mapped to the physical address.

8. The operating method according to claim 7, further comprising:
- unmapping, by the controller, the logical address and the physical address in response to the unmap request.

9. The operating method according to claim 6, wherein the second event includes a request which induces the erase operation, from an external device.

10. The operating method according to claim 6, wherein the performing of the erase operation further comprises:
- performing, by the controller, a copy operation for valid data in a target memory block including a memory region corresponding to the physical address, to another memory block, before the performing of the erase operation.

11. The operating method according to claim 6, wherein the erase count includes an erase count of a memory block including a memory region corresponding to the physical address.

12. An operating method of a data storage device including a controller and a nonvolatile memory device including a plurality of memory blocks, the operating method comprising:
- comparing, by the controller, a current value of an erase count at the time of receiving a purge request from an external device, with a reference value of the erase count at the time of receiving an unmap request from the external device, the erase count corresponding to a physical address of the nonvolatile memory device;
- performing, by the controller, a purge operation for the physical address when the current value is identical to the reference value, and
- skipping, by the controller, the performing of the purge operation when the current value is different from the reference value.

13. The operating method according to claim 12, further comprising:
- receiving, by the controller, the unmap request for a logical address mapped to the physical address, from the external device, before receiving the purge request; and
- unmapping, by the controller, the logical address and the physical address in response to the unmap request.

14. The operating method according to claim 13, further comprising:
- storing, by the controller, a value of the erase count as the reference value in response to the unmap request.

* * * * *